(12) United States Patent
To

(10) Patent No.: US 9,787,875 B2
(45) Date of Patent: Oct. 10, 2017

(54) ELECTRONIC APPARATUS AND USER AUTHENTICATION METHOD THEREFOR

(71) Applicant: KYOCERA Document Solutions Inc., Osaka (JP)

(72) Inventor: Tenken To, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 77 days.

(21) Appl. No.: 14/946,034

(22) Filed: Nov. 19, 2015

(65) Prior Publication Data

US 2016/0142585 A1     May 19, 2016

(30) Foreign Application Priority Data

Nov. 19, 2014  (JP) ................................ 2014-234117

(51) Int. Cl.
*H04N 1/44*     (2006.01)
*H04N 1/00*     (2006.01)

(52) U.S. Cl.
CPC ....... *H04N 1/4413* (2013.01); *H04N 1/00477* (2013.01); *H04N 1/4433* (2013.01); *H04N 2201/0094* (2013.01)

(58) Field of Classification Search
CPC ............. H04N 1/4413; H04N 1/00477; H04N 1/4433; H04N 2201/0094
USPC ................................................ 358/1.14, 1.15
See application file for complete search history.

(56) References Cited

U.S. PATENT DOCUMENTS

2008/0007758 A1* 1/2008 Miyashita ............. G06F 21/629
                                                                 358/1.14
2014/0211240 A1* 7/2014 Maki ..................... G06F 3/1222
                                                                 358/1.14

FOREIGN PATENT DOCUMENTS

| JP | 2001-282739 A | 10/2001 |
| JP | 2005-202711 A | 7/2005 |
| JP | 2006-113675 A | 4/2006 |
| JP | 2006-163934 A | 6/2006 |

* cited by examiner

*Primary Examiner* — Kent Yip
(74) *Attorney, Agent, or Firm* — Hawaii Patent Services; Nathaniel K. Fedde; Kenton N. Fedde

(57) ABSTRACT

Provided is an electronic apparatus (EA) and a user authentication method thereof both can prevent information leakage and disadvantages caused by an unauthorized access to the EA. The EA is configured to store a combination of a recognizing-code and a key-code correlated therewith, the combination being in relationship with each of plural users, and to give a user an exclusive authority for executing a specific process if an inputted combination of a recognizing-code and a key-code=the stored combination of the recognizing-code and the key-code. In case of a request for accepting the specific process, if the inputted combination of the recognizing-code and the key-code is≠the stored combination of the recognizing-code and the key-code, the EA notifies, without executing the specific process, initiating a receipt of instructing the specific process to user of the inputted combination.

8 Claims, 14 Drawing Sheets

|  | MANAGEMENT USER | REGISTERED USER | TEMPORARY USER | UNKNOWN USER |
|---|---|---|---|---|
| PRINTING PROCESS (PRINTING PART 160) | OK | OK | ONLY SMALL AMOUNT SPOOLING OK | OK BUT INPUTTED DATA INVALID |
| SCAN PROCESS (SCANNER PART 150) | OK | OK | ONLY SMALL AMOUNT SCANNING OK | ONLY SMALL AMOUNT OF PAGES OK BUT SCANNED DATA INVALID |
| EQUIPMENT SETTING REGION 1203 | OK | NO | NO | NO |
| SECURITY REGION 1204 | OK | NO | NO | NO |
| USER MANAGEMENT REGION 1206 | OK | NO | NO | NO |
| SERVER REGION 1209 | ALL REGIONS READ/WRITE OK | ONLY CORRESPONDING REGION USER ID OK | ONLY SMALL DATA AMOUNT WRITING & DUMMY DATA READING OK | ONLY DUMMY DATA READING OK |

| LOGICAL ADDRESS (REGION) | 120: MEMORY PART | | | | | | |
|---|---|---|---|---|---|---|---|
| | DATA (CONTENT) | | | | | | |
| x000 ... x009 | TERMINAL INFORMATION REGION (1201) | TERMINAL UNIQUE ADDRESS | | | | | |
| | | TERMINAL UNIQUE ID | | | | | |
| x010 ... x019 | PROGRAM REGION (1202) | | | | | | |
| x020 ... x029 | EQUIPMENT SETTING REGION (1203) | | | | | | |
| x030 ... x039 | SECURITY REGION (1204) | LIMITED PROTOCOL LIST | | BLOCK SUPPORT LIST | | | |
| | | IP FILTER LIST | | SERVICE SETTING | | | |
| x040 ... x049 | MESSAGE IMAGE REGION (1205) | IMAGE GROUP FOR REGISTERED USER | | IMAGE GROUP FOR UNKNOWN USER | | | |
| | | LOG-IN MESSAGE IMAGE 1205a-1 | | LOG-IN MESSAGE IMAGE 1205b-1 | | | |
| | | LOG-IN MESSAGE IMAGE 1205a-2 | | LOG-IN MESSAGE IMAGE 1205b-2 | | | |
| | | LOG-IN MESSAGE IMAGE 1205a-3 | | LOG-IN MESSAGE IMAGE 1205b-3 | | | |
| x050 ... x059 | USER MANAGEMENT REGION (1206) | USER NUMBER | USER ID | USER ATTRIBUTE | PASSWORD | PERSONAL MARK (COORDINATE VALUE) | LATEST LOG-IN DATE & TIME | LATEST LOG-OUT DATE & TIME |
| | | (1) | MND05923 | MANAGEMENT | U2t5cGXj | □□□□ | 2013.10.07 18:20:53 | --- |
| | | (2) | SB000298 | GENERAL | KSik2NSR | ○○○○ | 2014.08.15 11:46:14 | 2014.08.15 12:00:56 |
| | | (3) | DMA01163 | TEMPORARY (GUEST) | Sn5qmf6I | △▽△▽ | 2013.01.25 20:09:26 | 2013.01.25 20:20:11 |
| x060 ... x069 | LOG-IN MANAGEMENT REGION (1207) | LOG-IN NUMBER | USER ID | LOG-IN DATE & TIME | TERMINAL ADDRESS | LOG-IN TYPE (1207a) | | |
| | | (1) | DMA01163 | 2014.09.09 09:35:25 | 192.168.000.150 | REGISTERED USER | | |
| | | (2) | SB000298 | 2014.09.10 15:14:20 | 196.187.230.57 | REGISTERED USER | | |
| | | (3) | PNL01969 | 2014.09.10 15:15:08 | 208.94.21.54 | UNKNOWN USER | | |
| x070 ... x079 | OPERATION REGION (1208) | | | | | | |
| x080 ... x089 | SERVER REGION (1209) | DATA NUMBER | USER ID | ATTRIBUTE | ACCESS DATE & TIME | ACCESS TERMINAL INFORMATION | DATA TYPE | DATA MAIN BODY |
| | | (1) | --- | FULL USER | 2014.09.09 19:56:24 | +81308205529 | FACSIMILE | |
| | | (2) | SB000298 | SPECIFIC USER | 2014.09.10 15:11:33 | | SCAN DOCUMENT | |
| | | (3) | DMA01163 | WRITE ONLY | 2014.09.11 07:45:26 | 192.168.036.150 | PRINT DOCUMENT | |
| | DUMMY DATA (1209b) | | | | | | |
| x090 ... | | | | | | | |

FIG.3

| | MANAGEMENT USER | REGISTERED USER | TEMPORARY USER | UNKNOWN USER |
|---|---|---|---|---|
| PRINTING PROCESS (PRINTING PART 160) | OK | OK | ONLY SMALL AMOUNT SPOOLING OK | OK BUT INPUTTED DATA INVALID |
| SCAN PROCESS (SCANNER PART 150) | OK | OK | ONLY SMALL AMOUNT SCANNING OK | ONLY SMALL AMOUNT OF PAGES OK BUT SCANNED DATA INVALID |
| EQUIPMENT SETTING REGION 1203 | OK | NO | NO | NO |
| SECURITY REGION 1204 | OK | NO | NO | NO |
| USER MANAGEMENT REGION 1206 | OK | NO | NO | NO |
| SERVER REGION 1209 | ALL REGIONS READ/WRITE OK | ONLY CORRESPONDING REGION USER ID OK | ONLY SMALL DATA AMOUNT WRITING & DUMMY DATA READING OK | ONLY DUMMY DATA READING OK |

FIG.4

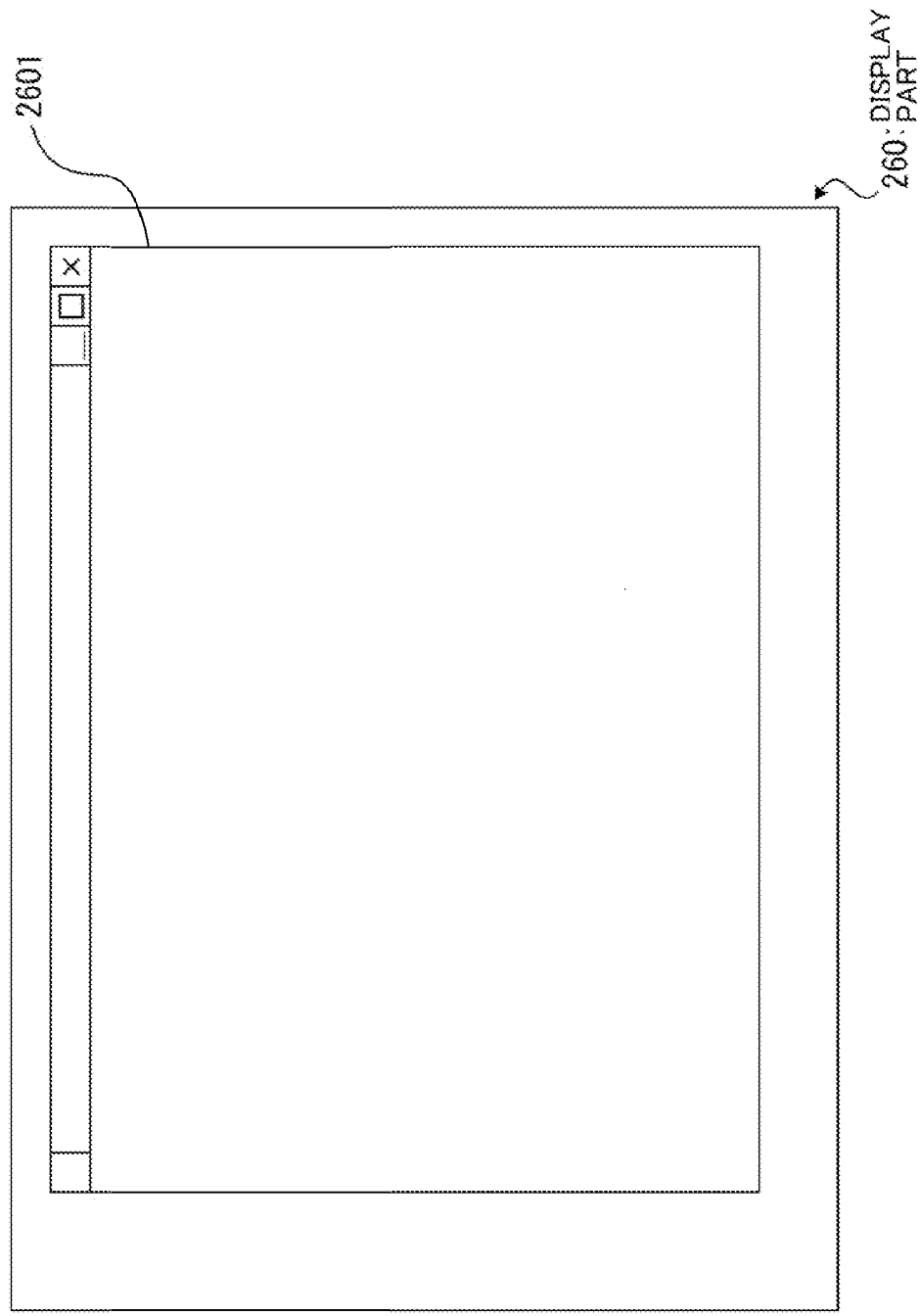

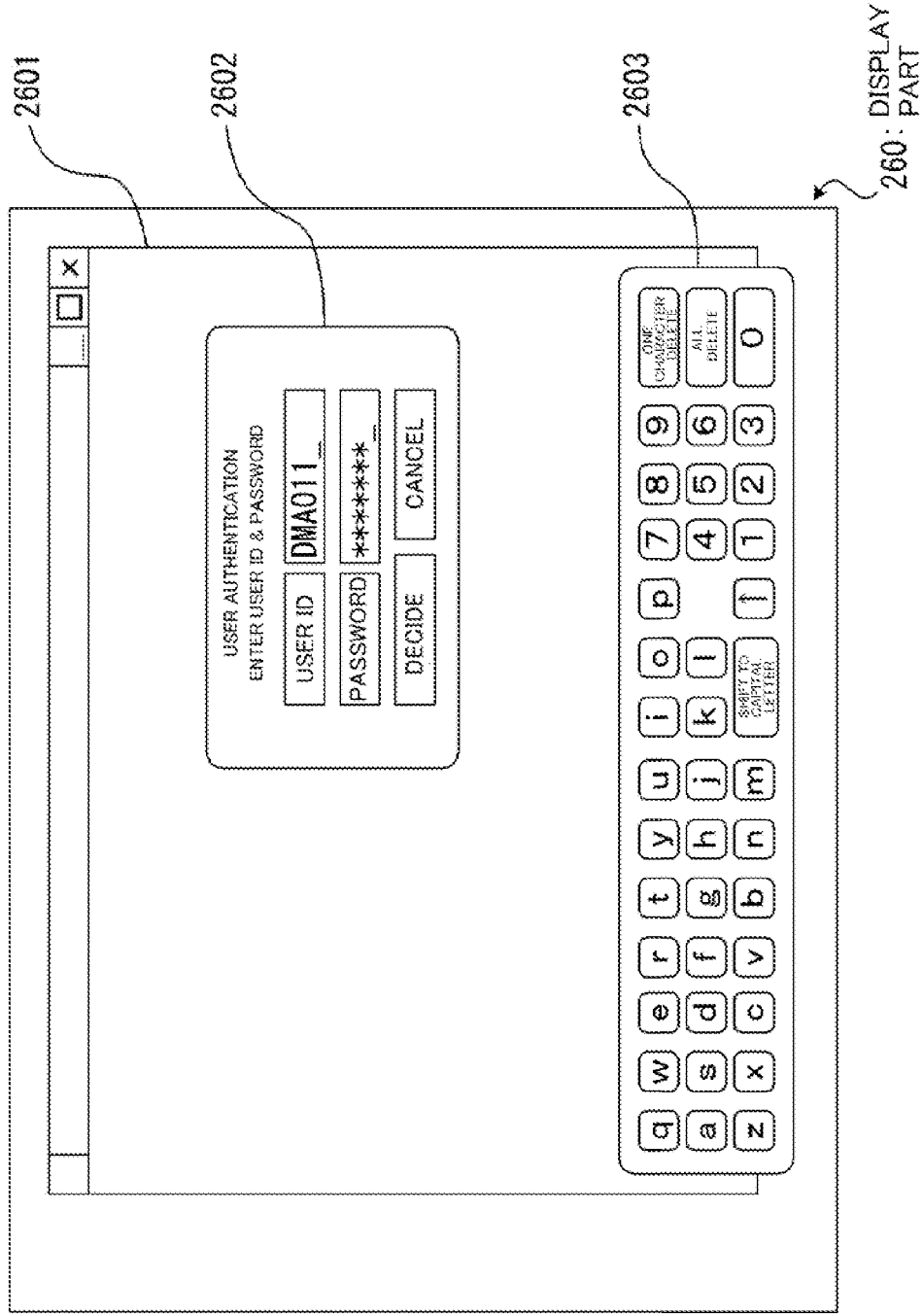

| 120: MEMORY PART ||
|---|---|
| LOGIC ADDRESS (REGION) | DATA (CONTENT) |
| x 0 0 0 · · · · x 0 3 9 | |
| x 0 4 0 · · · x 0 4 9 | MESSAGE IMAGE REGION (1205) |
| x 0 5 0 · · · | |

| | IMAGE GROUP FOR REGISTERED USER | IMAGE GROUP FOR UNKNOWN USER |
|---|---|---|
| | YOU ARE REGISTERED USER (1205a-1) | YOU ARE GUEST USER (1205b-1) |
| | WELCOME ! AVAILABLE ! (1205a-2) | WELCOME ! AVAILABLE ! (1205b-2) |
| | ENTER DATA NUMBER (1205a-3) | ENTER DATA NUMBER (1205b-3) |

FIG.7

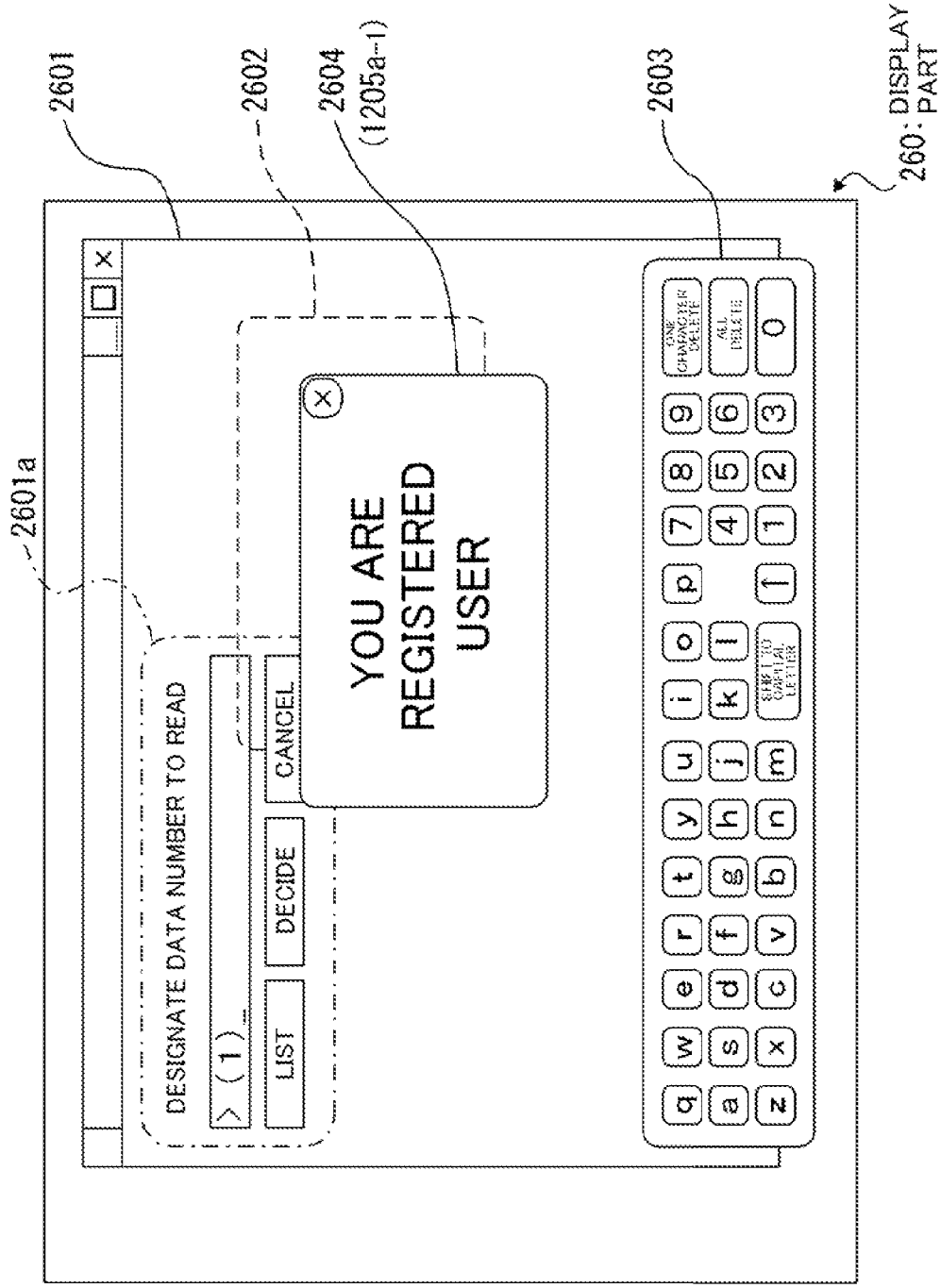

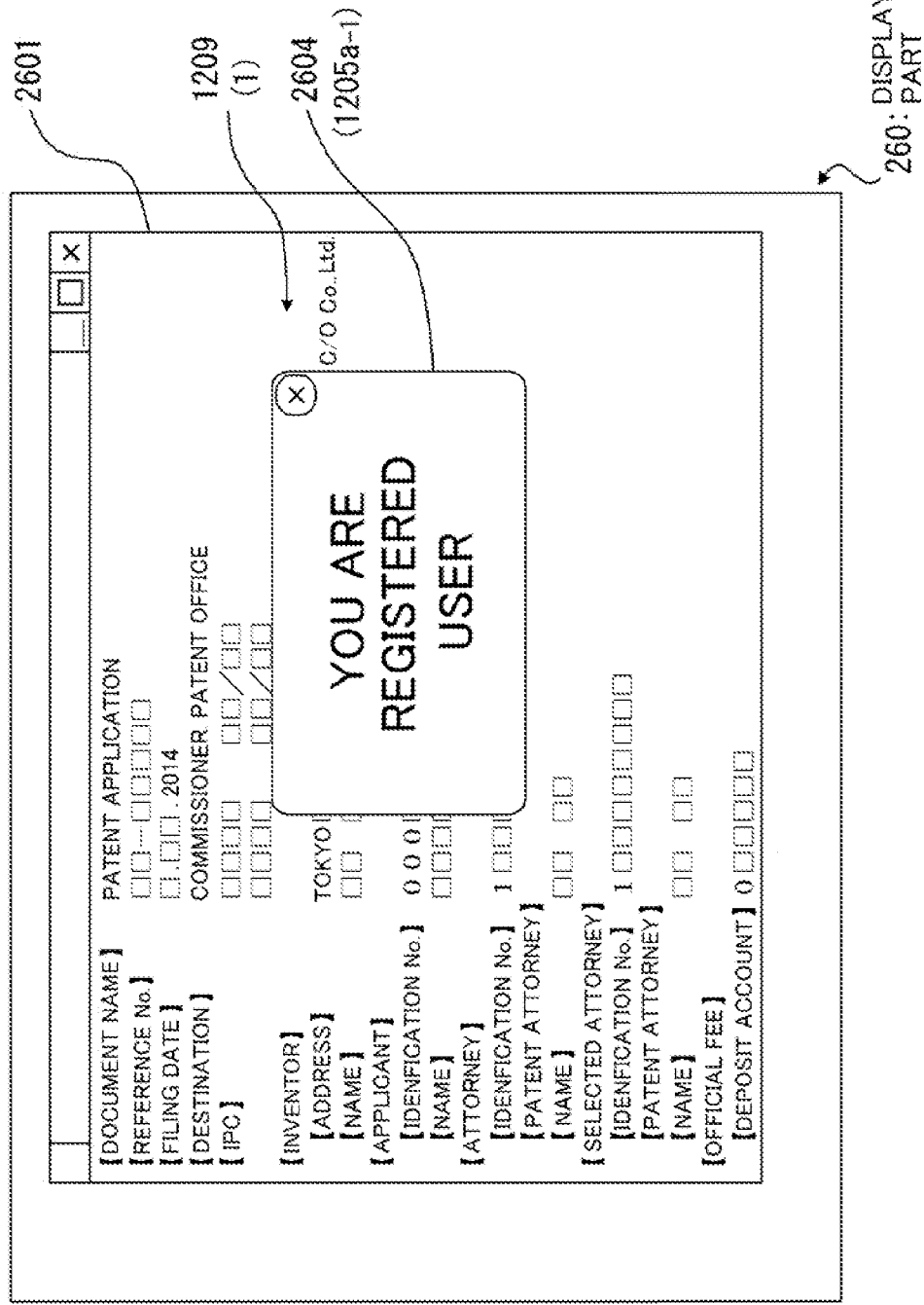

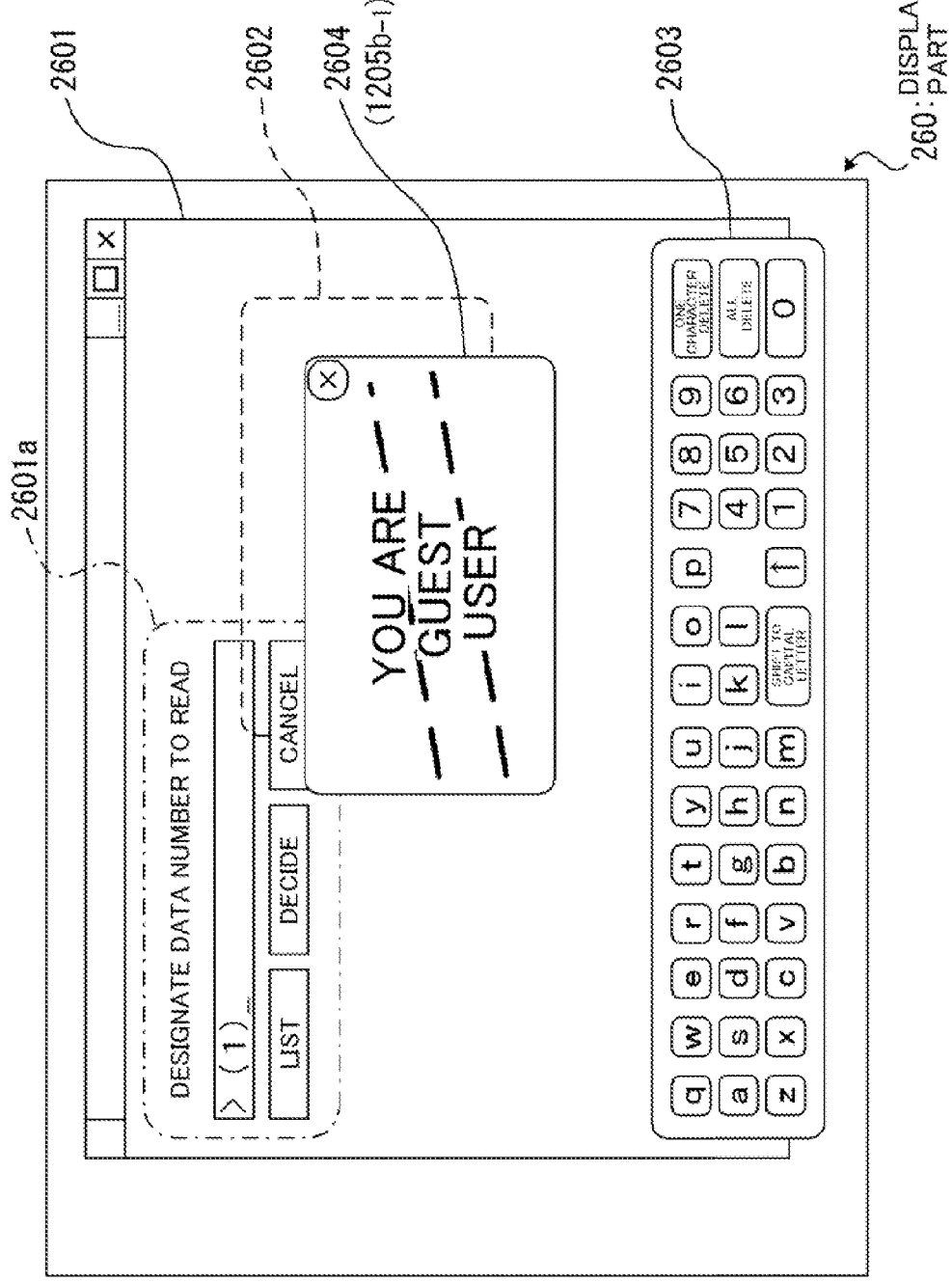

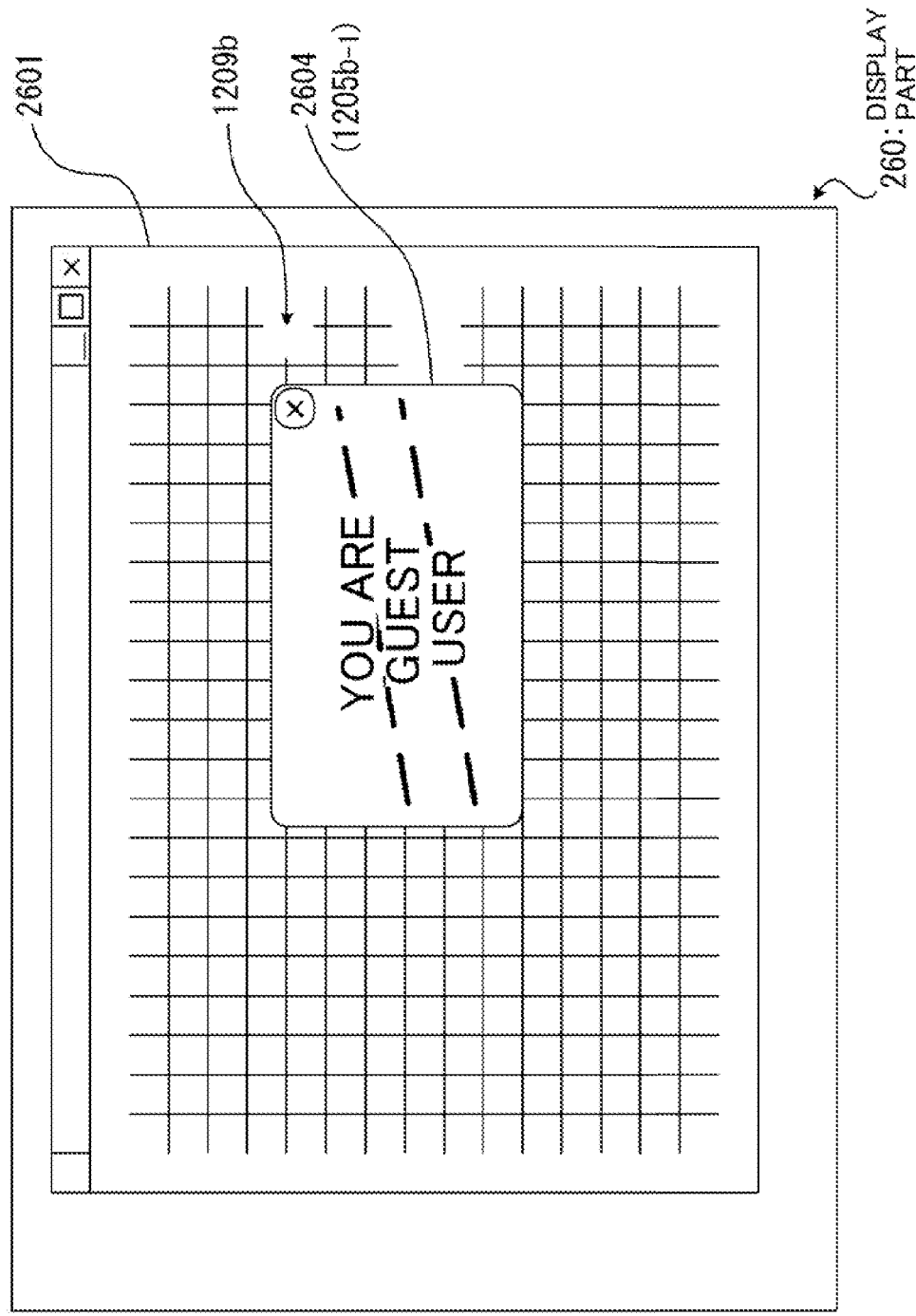

| LOGIC ADDRESS (REGION) | 120a : MEMORY PART | | | |
|---|---|---|---|---|
| | DATA(CONTENT) | | | |
| x000 ⋮ x009 | TERMINAL INFORMATION REGION (1201) | TERMINAL UNIQUE ADDRESS | | |
| | | TERMINAL UNIQUE ID | | |
| | | ⋮ | | |
| x010 ⋮ x019 | PROGRAM REGION (1202a) | IMAGE DATA CREATING PROGRAM (1202a-1) | | OBFUSCATING PROGRAM (1202b-2) |
| x020 ⋮ x029 | EQUIPMENT SETTING REGION (1203) | | | |
| x030 ⋮ x039 | SECURITY REGION (1204) | LIMITED PROTOCOL LIST | | BLOCK SUPPORT LIST |
| | | IP FILTER LIST | | SERVICE SETTING |
| | | ⋮ | | ⋮ |
| x040 ⋮ ⋮ ⋮ x049 | MESSAGE (1205c) | 1205c-1 | YOU ARE REGISTERED USER | |
| | | 1205c-2 | WELCOME. AVAILABLE | |
| | | 1205c-3 | ENTER DATA NUMBER | |
| | | 1205c-4 | WELCOME MR/MS | |
| | | 1205c-5 | MR/MS ENTER | |
| | | 1205c-6 | MR/MS ●●●●●●●● ENTER | |
| | | ⋮ | ⋮ | |
| | | 1205c-11 | YOU ARE GUEST USER | |
| | | ⋮ | ⋮ | |
| x050 ⋮ x059 | USER MANAGEMENT REGION (1206) | USER NUMBER | USER ID | USER ATTRIBUTE | PASSWORD | PERSONAL NAME (CORPORATE NAME) | LATEST LOG-IN DATE & TIME | LATEST LOG-OUT DATE & TIME |
| | | (1) | MND05923 | MANAGEMENT | U2t5cGXj | ☐☐☐☐ | 2013.10.07 18:20:53 | —.—.— —:—:— |
| | | (2) | SBQ00298 | GENERAL | KSik2NSR | ○○○○ | 2014.08.15 11:46:14 | 2014.08.15 12:00:56 |
| | | (3) | DMA01163 | TEMPORARY(GUEST) | Sn5qmf6I | △▽△▽ | 2013.01.25 20:09:26 | 2013.01.25 20:20:11 |
| | | ⋮ | ⋮ | ⋮ | ⋮ | ⋮ | ⋮ | ⋮ |
| x060 ⋮ | | ⋮ | | | | | | |

FIG.10

ELECTRONIC APPARATUS AND USER AUTHENTICATION METHOD THEREFOR

INCORPORATION BY REFERENCE

This application is based on and claims the benefit of priority from Japanese Patent Application No. 2014-234117 filed on Nov. 19, 2014, the entire contents of which are hereby incorporated by reference.

BACKGROUND

The present disclosure relates a user authentication technology for the prevention of any unauthorized access to an electronic apparatus, the electronic apparatus being configured to be shared with plural users by, for example, network connections and concurrently to store secret or confidential information pieces.

In a case where an electronic apparatus is operated in which information pieces are held that specific individuals or juridical persons stored and personal information pieces or in a case where a server that stores similar information pieces is brought into a remote read/write operation, it is requested to receive an authentication for a user who has a plan to access the electronic apparatus or the server in order for proving that the user has an authority to access the aforementioned information pieces. The most popular method for receiving an authentication is to input both a code that is indicative of a user ID (Identification) and a password (key encode) that makes a pair with the user ID.

For example, in a case of an MFP that has facsimile and server functions as well as printer and scanner functions, an input/output image that is called a UI (User Interface) appears on a screen of an indicator provided on an operation panel or on a screen of an electronic information terminal connected via an external interface.

Such an MFP is provided with a user authentication function (many MFPs have user authentication functions). When a user inputs, via the UI interface, the ID and the password, a verification is made whether or not the resulting paired ID and password are in coincidence with a pair of previously stored ID and password. If the result of the verification is true, the user is allowed to log in the MFP (the MFP is ready for operation).

In more detail, the user inputs the user ID and the password via the UI, and then if the inputted pair of the user ID and the password are determined to be in coincidence with the pair of previously stored ID and password that are previously registered for a legitimate user, a specific operation is allowed to read out, for example, information pieces (such as an image data piece obtained by scanning a manuscript) which are correlated with the user ID.

On the contrary, if the paired user ID and password is registered in the MFP, usually, the MFP causes the UI to display an error display.

SUMMARY

A present disclosure provides an electronic apparatus that is configured to store a combination of a recognizing code and a key code that is correlated with the recognizing code, the combination being in relationship with each of plural users and allows a user exclusively to give an authority for executing a specific process if an inputted combination of a recognizing code and a key code is coincident with the stored combination of the recognizing code and the key code. In a case where a request for accepting the specific process, if the inputted combination of the recognizing code and the key code is not coincident with the stored combination of the recognizing code and the key code, the electronic apparatus according to the present disclosure notifies, without executing the specific process, a receipt of instructing the specific process to user who inputs the combination of the recognizing code and the key code for executing the specific process, which is a feature of the electronic apparatus according to the present disclosure.

Also, a present disclosure provides a user authentication method for use in conjunction with an electronic apparatus, wherein storing a combination of a recognizing code and a key code that is correlated with the recognizing code, the combination being in relationship with each of plural users, and allowing a user exclusively to give an authority for executing a specific process if an inputted combination of a recognizing code and a key code is coincident with the stored combination of the recognizing code and the key code. In a case where a request for accepting the specific process, if the inputted combination of the recognizing code and the key code is not coincident with the stored combination of the recognizing code and the key code, the method of the present disclosure causes the electronic apparatus to notify, without executing the specific process, a receipt of instructing the specific process to user who inputs the combination of the recognizing code and the key code for executing the specific process, which is a feature of the method according to the present disclosure.

BRIEF DESCRIPTION OF THE DRAWINGS

FIG. 3 is a memory configuration diagram that is illustrative of a content (memory map) of a memory part 120 in the exemplary embodiment of the present disclosure;

FIG. 4 is a table that is illustrative of access authority levels that are determined by a relationship between each part of the MFP 11 and a user log-in level in the exemplary embodiment of the present disclosure;

FIG. 5A illustrates an example that appears on a display part 260 of the MFP 11 in the exemplary embodiment of the present disclosure.

FIG. 5B illustrates an example that appears on the display part 260 of the MFP 11 in the exemplary embodiment of the present disclosure;

FIG. 7 illustrates examples of log-in message images 1205a and 1205b in the exemplary embodiment of the present disclosure;

FIG. 8A illustrates a display example on the display part 260 of the MFP 11 in the exemplary embodiment of the present disclosure;

FIG. 8B illustrates a display example on the display part 260 of the MFP 11 in the exemplary embodiment of the present disclosure;

FIG. 9A illustrates a display example on the display part 260 of the MFP 11 in the exemplary embodiment of the present disclosure;

FIG. 9B illustrates a display example on the display part 260 of the MFP 11 in the exemplary embodiment of the present disclosure;

FIG. 10 is a memory configuration diagram that is illustrative of a content (memory map) of a memory part 120a in a medication of the exemplary embodiment of the present disclosure.

DETAILED DESCRIPTION

Figure 1:
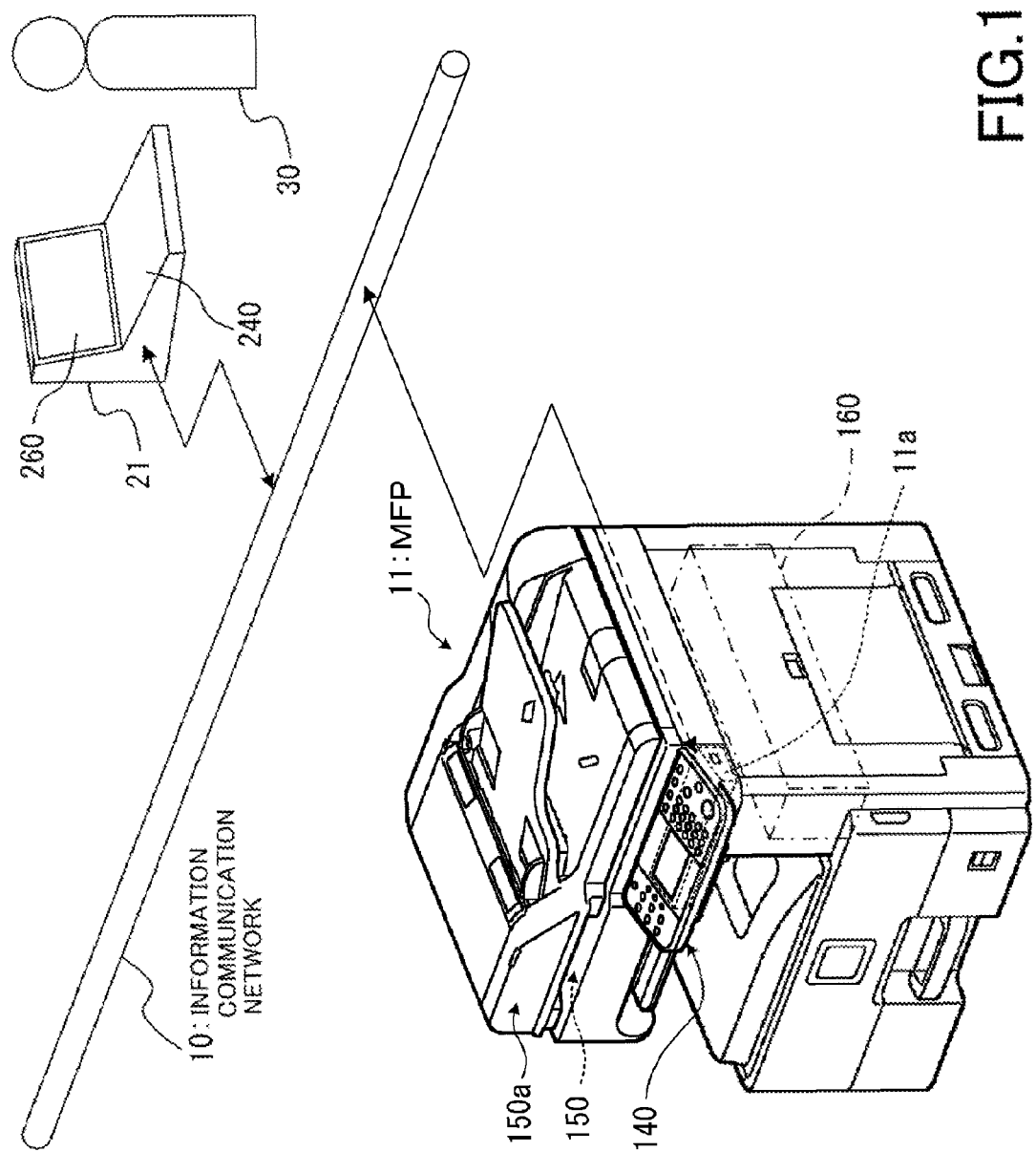
FIG. 1 is a schematic view of an example of an overall configuration to which are applied an electronic apparatus and a user authentication method therefor according to the present disclosure.

Next, an exemplary embodiment of the present disclosure will be detailed with reference to the attached drawings. AS shown in FIG. 1, the present exemplary embodiment deals with an example case in which a user 30 logs in to an MFP (Multi-Function Peripheral) 11 that is connected to an information communication network 10 from an information terminal 21 such as a PC (Personal Computer) that is connected likewise to the information communication network 10.

Figure 2:
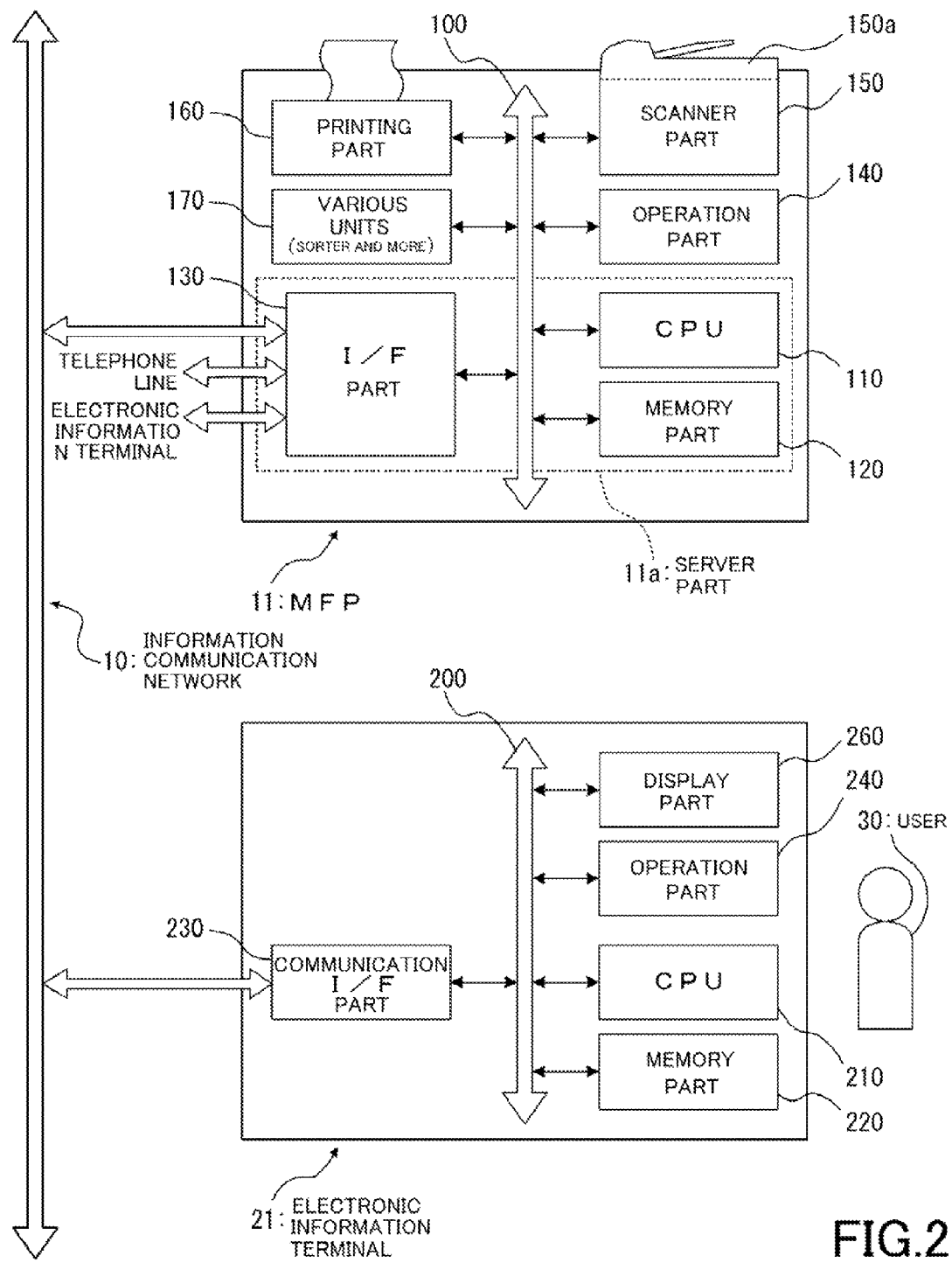
FIG. 2 is a block diagram for illustrating an example of a configuration (electronic configuration) of an MFP 11 and an example of a configuration (electronic configuration) of an electronic information terminal 21 both of which are provided in an exemplary embodiment of the present disclosure.

The MFP 11 whose overall configuration and electrical configuration are shown in FIG. 1 and FIG. 2, respectively, stores in its server portion 11a secret documents that are transmitted via a facsimile or read by a scanner part 150. In addition, the MFP 11 is configured to authenticate a user using a user ID that is previously registered. The user ID registration is made before using the MFP 11 for establishing user identification and grasping the number of printed sheets per user.

In the present exemplary embodiment, being authenticated as a regularly registered user whose user ID and password are registered in the MFP 11 is referred as "user authentication" and making the MFP 11 usable by a user regardless of whether or not he/she is a regularly registered user is referred to as "log-in (log in)".

Referring to FIG. 1 and FIG. 2, in the MFP 11, a BUS 100 is in connection with a CPU (Central Processing Unit) 110, a memory part 120, and an I/F (Interface) part 130.

These elements, the CPU 110 and the memory part 120, and the I/F part 130 constitute a server part 11a (a portion enclosed by a dotted line).

The CPU 11 controls the whole of the MFP 11 based on operation programs that are stored previously on the memory part 120. The memory part 120 includes an image data memory part 120c. The memory part 120 stores, other than the operation programs, setting (setting of installation environmental or the like) information that is unique for the MFP 11, physical configuration information, information related to users who are registered in the MFP 11 for using the same.

It is to be noted that the memory part 120 is made up of non-volatile memory devices and volatile memory devices, the non-volatile memory devices including, for example, a ROM (Read Only Memory), an HDD (Hard Disk Drive), and a flash memory, while the volatile memory devices including various RAMS (Random Access Memory). However, how to combine which type (character) of memory devices for usage is not a featured point of the present disclosure and therefore detailing these memory devices is omitted.

The communication I/F part 130, which is used to connect the MFP 11 to an external devices, includes, for example, an interface (modem) that allows the MFP 11 to connect the telephone line for a facsimile transceiving and an interface (for parallel data transmission or for serial data transmission) that allows the MFP 11 to connect to an electronic terminal or the like, other than interfaces (such as various LANs) that allows the MFP 11 to connect to the information communication network 10.

Other than the aforementioned devices, the BUS 100 is in connection with an operation part 150, a scanner part 150, a printing part 160, and another unit (such as a sorter unit).

The operation part 140 is made up of, for example, a keyboard and an LCD (Liquid Crystal Display).

The scanner part 150 reads an image of a manuscript or the like in an optical manner. Also, an ADF 150a is located on the image scanner part 150. The ADF 150a is configured to feed out manuscripts (in the form of plural pages) that are piled on one another, one by one, in a sequential manner and to convey the resulting manuscript D to an upper surface of the scanner part 150.

The printing part 160 prints various processed results (including an image processed result of an externally inputted image data) by the CPU 110 on recording sheets or the like.

On the other hand, in the electronic terminal 21, a BUS 200 is connected with a CPU 210, a memory part 220 and a communication I/F part 230, and further an operation part 240, a display part 260 and the like.

This CPU 210 controls the whole of the electronic information terminal 21 based on operation programs that are stored previously on the memory part 220.

As the memory part 220, a combination of an HDD and various RAMS is available that is used in many other memory devices, but a combination of a flash memory and a RAM may be available that is sometimes in other memory devices.

The communication I/F part 230, which is used to connects the electronic information terminal 21 to the information communication network 10, is in the form of a wired interface and otherwise a wireless interface that complies with various protocols.

Though the operation part 240 is, in general, in the form a keyboard that a user manipulates, some operation parts are operable by numeric buttons and several code buttons.

The display part 260 is configured by using an LCD, but some are provided with a touch panel that the user 30 can manipulate.

Here, a content that the memory part 120 stores in the present exemplary embodiment will be described. FIG. 3 illustrates a relationship between allocated addresses in the memory part 120 and data pieces that are correspondingly recorded therein. In FIG. 3, each region is indicated in term of logical address, the size (such as the number of bytes) of data piece in one unit address varies depends on the content. In addition, from a view point of physical address, a set of data pieces (such as an image data pieces of one page) are sometimes stored in a plurality of discontinuous physical addresses in a separate manner.

It is to be noted that the electronic information terminal 21 also has the memory part 220, similar to the MFP 11 that has the memory part 120. Thus, the content stored in the memory part 220 and how to use its regions (or memory spaces) are identical with those of commonly used computers and mobile terminal and therefore their descriptions and illustrations are omitted.

As shown in FIG. 3, the memory part 120 is provided with a terminal information region 1201 (logical addresses x000-x009), a program region 1202 (logical addresses x010- x019), an equipment setting region 1203 (logical addresses x020-x029), a security region 1204 (logical addresses x030-x039), a message image region 1205 (logical addresses x040-x049), a user management region 1206 (logical addresses x050-x059), a log-in management region 1207 (logical addresses x060-x069), an operation region 1208 (logical addresses x070-x079), and a server region 1209 (logical addresses x080-x089).

In this terminal information region 1201, there are stored, as unique information pieces to the MFP 11, a terminal unique address (such as an IP address) and a terminal unique ID (such as a MAC address). In addition, the program region 1202 stores programs that cause the MFP 11 to operate.

The equipment setting region 1203 stores environmental conditions (that includes, for example, a specification information piece of consumable articles to be used and conditions for connection of peripheral equipment).

The security region 1204 stores security setting items that are very important for establishing a safeguarded connection of the MFP 11 to the information communication network 10, the setting items including a list restricted protocols, a list of block ports, and a list of IP filters and service settings which are for restricting an access to the MFP 11.

As one of the security settings, in the present exemplary embodiment, there is provided (as will be detailed later) restricting an access right to each of the parts (each process function) that constitute the MFP 11. As criteria for determining an access right, there are provided types of log-in which include "management user", "registered user", "temporary user", and "unknown user".

The "management user" is a user who is in charge of conducting maintenance tasks that include, for example, adding or changing a setting of the MFP 11 and deleting an unnecessary stored data piece.

In addition the registered user" is a regular user (except for the "management user") whose user ID and password are registered in the MFP 11.

The "temporary user" is a user in which a limited (guest) user and a registered user, the former user being, though his/her user ID and password are not registered in the MFP 11, he/she is permitted to use the MFP 11 in limited process functions and/or operation time duration, the latter being corresponding to a person who cannot be regarded as a registered user due to the fact that he/she has forgotten his/her password.

Further, the "unknown user" corresponds to a user, for example, who attempts to log in to the MFP 11 by using a user ID that is not registered in the MFP 11.

The message image region 1205 stores character strings of plural messages that are indicative of result of user authentication as a bit map image or raster image such as a JPEG image (one of the compressed formats).

The message image region 1205 is divided into a registered-user oriented image group and an unknown-user oriented image group. As the registered-user oriented image group, log-in message images 1205*a*-1, 1205*a*-2, 1205*a*-3 and more (herein after which will be referred simply as "log-in message image" as necessary) are stored, while log-in message images 1205*b*-1, 1205*b*-2, 1205*b*-3 and more (herein after which will be referred simply as "log-in message image" as necessary) are stored.

It is to be noted that details of the message images will be described later. In addition, though in the message image region 1205, it is possible to provide a management-user oriented image group and a temporary-user oriented image group, other than the registered-user oriented image group and the unknown-user oriented image group, describing the former two image groups is omitted in describing the present exemplary embodiment.

The user management region 1206 stores, as information pieces to be used for identifying all the users who are so registered in the MFP 11 as to access the same, for example, the user ID, a user attribute (the management user, the registered user, the temporary user, or the unknown user), the password, a personal name (that conceptually covers a cooperate name, common name, nick name, handle name, and the like), the latest log-in date and time, and the latest log-out date and time.

The log-in management region 1207 stores current information pieces of a user who has already logged in to the MFP 11 which include an address of a connected terminal (IP address assigned to an electronic information terminal or the like), and the log-in type 1207*a*.

The operation region 1208 is a region that the CPU 110 (see FIG. 2) uses for, say, converting or sorting various information pieces.

Further, the server region 1209 is a region that is used for storing text data pieces of facsimile received document and image data pieces of the documents that are read by the scanner part 150 as well as spooling (that is, storing temporarily) a printing data piece to undergo a printing job by the printing part 160 as described above.

Further, the server region 1209 stores a dummy data piece that is made up of an image data piece and a character string both of which fail to provide significant meanings.

It is to be noted that a region that is lower than the server region 1209 (an address subsequent to the logic address x090) is assigned for another use but whose description is omitted.

At this stage, an explanation is made as to a relationship between the aforementioned user log-in type 1207*a* and the user access right to each the parts that constitute the MFP 11.

Referring to FIG. 4, for example, in a case where the log-in type 1207*a* is the "management user", it is possible for him/her to access the printing process and scanning process. In addition, only the "management user" is allowed to access the equipment setting region 1203, the security region 1204, and the user management region 1206 (thus, no description is made as to access rights from the users other than the "management user" to the equipment setting region 1203, the security region 1204, and the user management region 1206). As apparent from the above, the "management user" is capable of accessing all the regions (all the attributes) in the server region 1209.

As for the "registered user, it is possible for him/her to access the printing process and scanning process. In addition, regarding the server region 1209, the "registered user" is allowed to only a data piece or region both of which are assigned with the user ID of the "registered user" (that is, the preceding data piece or region is one that this user recorded or is one that was recorded for being read out by this user having this user ID.

As for the "temporary user", he/she is allowed only to spool a small amount of printing data, the spooling being set differently from the printing process, and if he/she inputs the password later and then is authenticated as the "registered user", he/she is allowed to complete printing on the recording sheets. In addition, regarding the scanning process, and if he/she inputs the password later and then is authenticated as the "registered user", he/she is allowed for complete reading out from the server region 1209.

In a case of the "unknown user", though a request for a printing process is accepted, an inputted printing data piece is made invalid. This invalidating process may be in the form of an immediate deletion of the inputted printing data piece (deletion without spooling) or in the form of recording the inputted printing data piece in the server region 1209, within a small capacity range that is separately set, in order for the management user or specific registered users to read out. In addition, though a request for a scanning process is accepted, a data piece obtained at the scanner part 150 is made invalid (Details of the invalidating process of the scanning process is similar to that of the printing process).

Hereinbelow, an explanation is made as to a process of a log-in to the MFP 11 which is made for using the MFP 11 by way of the electronic information terminal 21.

As described above, for using the MFP 11, it is necessary, after completion of a user registration in the MFP 11, to receive a user authentication, via the electronic information terminal 21, from the MFP 11, but this user authentication can be obtained from the operation part 140 of the MFP 11. However, it is difficult to think of an unauthorized log-in from the operation part 140 by Brute-force attack and therefore no descriptions are omitted as to the log-in at the operation part 140 and subsequent authentication procedure.

At this stage, it is presumed that the electronic information terminal 21 has a function, when the MFP 11 requests to enter information pieces that are related to the user authentication, which causes the display part 260 to display an input screen by, for example, a browser (a software program for reading information) for accepting inputs from the operation part 240.

Further, in the present exemplary embodiment, the following descriptions are made in which log-in cases by the "registered user" and the "unknown user" cases are used as examples, but the cases of the "management user" and the "temporary user" should be applied to cases of the "registered user" and the "unknown user", respectively.

Hereinbelow, with reference to FIGS. 5A and 5B-FIGS. 9A and 9B, a description will be made as to a flow of a process that reads facsimile received image data pieces or the like from the server region 1209 via the electronic information terminal 21. It is to be noted that in a flowchart shown in FIG. 6, the left side of a dotted line illustrates a process executed by the electronic information terminal 21, while the right side of the dotted line illustrates a process executed by the MFP 11.

In this case, the user 30 activates, for example, a software program for browsing (whose detailed explanation will be omitted) on the electronic information terminal 21. Then, as shown in FIG. 5A, a browsing screen 2601 appears on the display part 260, a data reading request is transmitted from the server region 1209 to the MFP 11 (Step St11).

The MFP 11, when receives the data reading request from the electronic terminal 21, requests the electronic information terminal to display a log-in screen and to enter a user ID and a user password (Step St12)

In response to this request, as shown in FIG. 5B, on the display part 260, a log-in screen 260, an input auxiliary screen 2603 that includes a screen key board (software key board), and the like appear (Step St13).

When a user ID and a user password are inputted into specific portions of the log-in screen 2602 that has appeared (Step St14), the resulting user ID and user password are transmitted to the MFP 11.

Such input operations are conducted usually by the user 30 using the operation part 240, the input auxiliary screen 2603, or the like. However, sometimes, such input operations may be conducted using a certain software program that is activated on the electronical information terminal 21.

There are many cases of repeating the aforementioned unauthorized log-in by Brute-force attack due to using such a software program.

The MFP 11 determines whether or not the received user ID is registered in the user management region 1206. If the result is true, the MFP 11 determines whether or not the received password that is paired or combined with the received user ID is coincident with the registered user password in the user management region 1206 (Step St15).

(In Case of Registered User)

In Step St15, if the combination of the user ID and the user password that are transmitted from the electronic information terminal 21 is found to be registered, the MFP 11 authenticates the user who transmitted the data reading request in step St11 as the "registered user" (Step St21).

Here, explanations are made as to the log-in message images 1205*a*-1, 1205*a*-2, 1205*a*-3 and more, and the log-in message images 1205*b*-1, 1205*b*-2, 1205*b*-3 and more which are stored in the message image region 1205.

Among the memory maps that are indicative of the content of the memory part 120, especially, only the content of message image region 1205 is indicated in the form of an image.

In the present exemplary embodiment, when the user (regardless of whether or not he/she is a registered user) logged in to the MFP 11, the MFP 11 causes the electronic information terminal 21 to display a message that is indicative of the log-in completion.

However, the message to the normally registered user is displayed with a commonly used typeface such as courier (or gothic) as seen from the log-in message images 1205*a*-1, 1205*a*-2, 1205*a*-3 and more, while the message to the non-normally registered user is displayed with an obfuscated character string as seen from the log-in message images 1205*b*-1, 1205*b*-2, 1205*b*-3 and more.

This obfuscated character string means at least one character or message from which even an OCR software program or the like of the computer can extract a significant or meaningful word.

In detail, as seen from the log-in message images 1205*b*-1, 1205*b*-2, 1205*b*-3 and more, the obfuscated character string is a modified character string by making a partial combination between two adjacent characters (making it difficult to recognize individual characters), differentiating extremely the heights of the characters (making it to recognize lines), and overwriting a bar line on a character string (making the feature of each character unclear or vague).

Other than the aforementioned obfuscation modes, sometimes, there are provided other obfuscation modes that include inclining characters in different angles, causing each character to differentiate the upper end the lower end in width, and partial or total combination of these modes.

In addition, the message image group for the unknown user which includes the log-in message images 1205*b*-1, 1205*b*-2, 1205*b*-3 and more does not use an message that is indicative of a refusal for an authentication as the normal registered but uses an image that is indicative of a message of the fact of the log-in completion with an obfuscated character string.

In the above-described Step St21, if the user who transmitted the reading data request is authenticated as the "registered user", the MFP 11 transmits the log-in message image 120*a* (here, the log-in message image 1205*a*-1) (Step St22).

At this stage, referring to FIG. 8A, the electronic information terminal 21 deletes the log-in screen 2602 that appears on the display part 260 (Step St23) and causes the received log-in message image 1205a to appear, as a message screen 2604, on the display part 260 and concurrently causes a message 2601a that urges the user to enter items including a data number to be read to appear in the browsing screen 2601 (Step St24).

When the items including the data number to be read from the server region 1209 are entered in response to the display of the message 2601a (Step St25), the resulting information pieces are transmitted to the MFP 11. Entering items including the data number in response to the message 2601a is presumed to be made by the 30 using, for example, the operation part 240 or the input auxiliary screen 2603.

Then, the MFP 11, in response to the entered items including the data number, reads the designated data piece from the server region 1209 (Step St26) and transmits the resulting data piece to the electronic information terminal 21.

At last stage, the electronic information terminal 21 causes the data pieces that are read from the server region 1209 to appear on the browsing screen 2601 as seen from FIG. 8B (Step St27), and the process is terminated.

(In Case of Unknown User)

In Step St15, if the combination of the user ID and the user password that are transmitted from the electronic information terminal 21 is found not to be registered, the MFP 11 authenticates the user who transmitted the data reading request in step St11 as the "unknown user" (Step St31).

In a case where the MFP 11 authenticates the user who transmitted the data reading request in step St11 as the "unknown user" in Step St31, the MFP 11 transmits the log-in message 1205b (here, the log-in message 1205b-1) for the unknown user to the electronic information terminal 21 (Step St32).

At this stage, referring to FIG. 9A, the electronic information terminal 21 deletes the log-in screen 2602 that appears on the display part 260 (Step St33) and causes the received log-in message image 1205b to appear, as a message screen 2604, on the display part 260 and concurrently causes a message 2601a that urges the user to enter items including a data number to be read to appear in the browsing screen 2601 (Step St34).

That is to say, apparently, the log-in to the MFP 11 is completed and accessing to each part of the MFP 11 is made carried on.

At this stage, for example, when on the electronic information terminal 21 a summary message appears which displays that the combination of the user ID and the user password that are transmitted from the electronic information terminal 21 is found not to be registered in the user management region 1206 (failure in the authentication), which results in that an OCR software program or the like that runs on the electronic information terminal may recognize that the inputted user ID and password are not registered (Step St34'.

Figure 6:
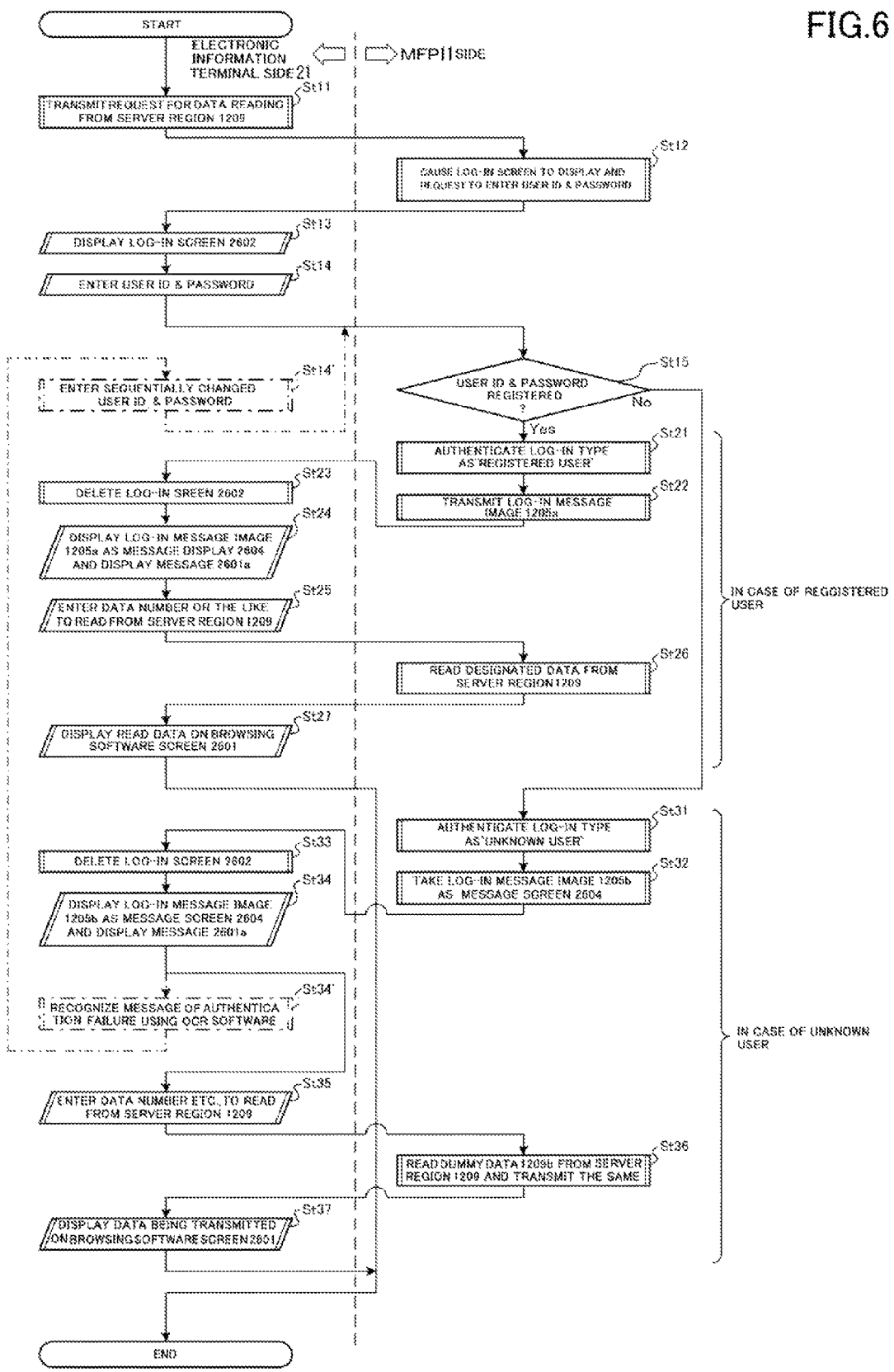
FIG. 6 is a flowchart that is illustrative of a process flow in the exemplary embodiment of the present disclosure.

If so, the Brute-force attack can be achieved by causing a combination of a user ID and a user password to change sequentially to enter the set portions of the log-in screen 2602, the changing being made by a software program or the like that runs on the electronic information terminal 21 (Step St 14') (the flow from Step St 34' to Step St14' is indicated in dotted lines in FIG. 6.

It is common sense that a user enters his/her memorized password when necessary and therefore the password (code) having a too long length (the number of digits) or having a combination of graphic symbols which are not readable as characters is inconvenient for the user.

That is to say, in many cases, the code that constitutes a password is limited to a character string having as high as tens of digits as a fixed combination of characters each of which is a daily used one and some marks.

The authentication using the preceding password may lead security vulnerability due to an unexpected log-in by a person other than a regular user, the unexpected log-in being resulted from a missing of the written password in being stored or viewing the password by an authorized person during inputting to UL.

Further, so long as a password is in the form of a fixed character string that is constituted by the combination of the limited number of kinds of characters and a numeral of a limited number of digits, the password is analyzed by Brute-force attack that tries to conduct an authentication, over and over again, by changing the combination of every character combination until the correct password is found, which also may result in an authorized log-in.

However, in the present exemplary embodiment, the log-in message image 1205b that is to be displayed in Step St34, as the message screen 2604, on the display part 260 is in the form of an obfuscated character string. Thus, it is impossible for the software program that runs on the electronic information terminal 21 to decide whether or not the Brute-force attack should be repeated due to the failure in the authentication.

The number of the combinations of user ID and password are very numerous. Thus, even though the user 30 tries to make a trial of an unauthorized log-in, the user 30 per se have to repeat input operations by changing the user ID and the pass word at each input operation, thereby providing a deterrence against such an unauthorized log-in.

After the message 2601a is displayed in Step St34, when information pieces that include the data number to be read from the server region 1209 (Step St35), the resulting information pieces are transmitted to the MFP 11.

The MFP 11, when received these information pieces, reads the dummy data 1209b from the server region 1209 (Step St36) and transmits the resulting data to the electronic information terminal 21.

At last stage, the electronic information terminal 21 displays the dummy data 1209b that the electronic information terminal 21 reads from the server region 1209 on the browsing screen 2601 (Step St37) and the process is terminated. FIG. 9B illustrates a detailed example of the dummy data 1209b.

In a case where the above-described Step St31 authenticates the user who has send the data reading request as the "unknown user", even inputting the information pieces that include the data number to be read from the server region 1209, no data is displayed on the browsing screen 2601 which is related the inputted data number. Instead, the images or character string such as the dummy data 1209b are displayed which fails to provide significant meanings.

As described above, the present exemplary embodiment allows, even in failure of a user authentication, for a log-in as the "unknown user" without notifying a message to the effect that user authentication is failed. In addition, deleting the log-in screen 2602 that is provided for inputting the user ID and user password will stop further inputting the user ID and user password causes, and apparently accessing to each part of the MFP 11 is made carried on. In such a way, the user ID and the password that are inputted using the OCR software program or the like are not recognized that they are not registered. Thereby, it is possible to achieve a prevention of unauthorized log-ins such as Brute-force attack that runs on the electronic information terminal.

It is to be noted that the present disclosure is not limited to the above-described exemplary embodiment and therefore obviously various modification may be made within the scope of the spirit of the present disclosure.

For example, the long-in message images 1205*a* and 1205*b* that the MFP 11 are not limited to the log-in message images 1205*a*-1 or the like and 1205*b*-1 or the like. On the contrary, for example, it is possible to select, every specified time or every day, only one log-in message image from among the long-in message images 1205*a*-1, 1205*a*-2, 1205*a*-3 and more and the long-in message images 1205*b*-1, 1205*b*-2, 1205*b*-3 and more, or to select any log-in message image from among the preceding log-in image images at random whenever the authentication is made (At that time, for the prevention of recognizing the time at which the log-in message image changes, for example, even though the log-in by the registered user is continued, changing the log-in message image will provide higher effects).

In addition, the present exemplary embodiment provides, as the message screen 2604, the long-in message images 1205*a*-1, 1205*a*-2, 1205*a*-3 and more and the long-in message images 1205*b*-1, 1205*b*-2, 1205*b*-3 and more, which the present disclosure provides as non-limited examples.

For example, referring to FIG. 10, a memory part 120 (whose peripheral configuration is identical with that of the memory part 120 shown in FIG. 2 and therefore detailing the peripheral configuration of the memory part 120*a* is omitted) stores, at a portion of the program region 1202*a* that occupies the logical addresses x010-x019, an image data creating program 1202*a*-1 and an obfuscating program 1202*a*-2.

In addition, in the log-in message region 1205*c* that occupies the logic address x040-x049, there are stored plural log-in messages each of which is made up of coded text data pieces.

Thus, at a time when the user who has transmitted the data reading request is authenticated as either one of the "registered user" and "unknown user", a message is selected from either one of the log-in messages 120*c*-1, 1205*c*-2, and 1205*c*-3. Then, the image data creating program 1202*a*-1 converts the resulting log-in message 2 to an image that is corresponded one of the long-in message images 1205*a*-1, 1205*a*-2, 1205*a*-3 and more and the long-in message images 1205*b*-1, 1205*b*-2, 1205*b*-3 and more.

In addition, in a case where the user who has transmitted the data reading request is authenticated as the "unknown user", the MFP 11, using the obfuscating program 1202*a*-2, converts the converted message image to an obfuscated message image and transmits the resulting or obfuscated message image to the electronic information terminal 21.

Further, when forming an obfuscated message image using the obfuscating program 1202*a*-2, if the user who has transmitted the data reading request is authenticated as the "registered user", the message image can be formed such that the character string such as the log-in message 1205*c*-4 or 1205*c*-5 is added with the name of the user who has been authenticated.

Figure 11:
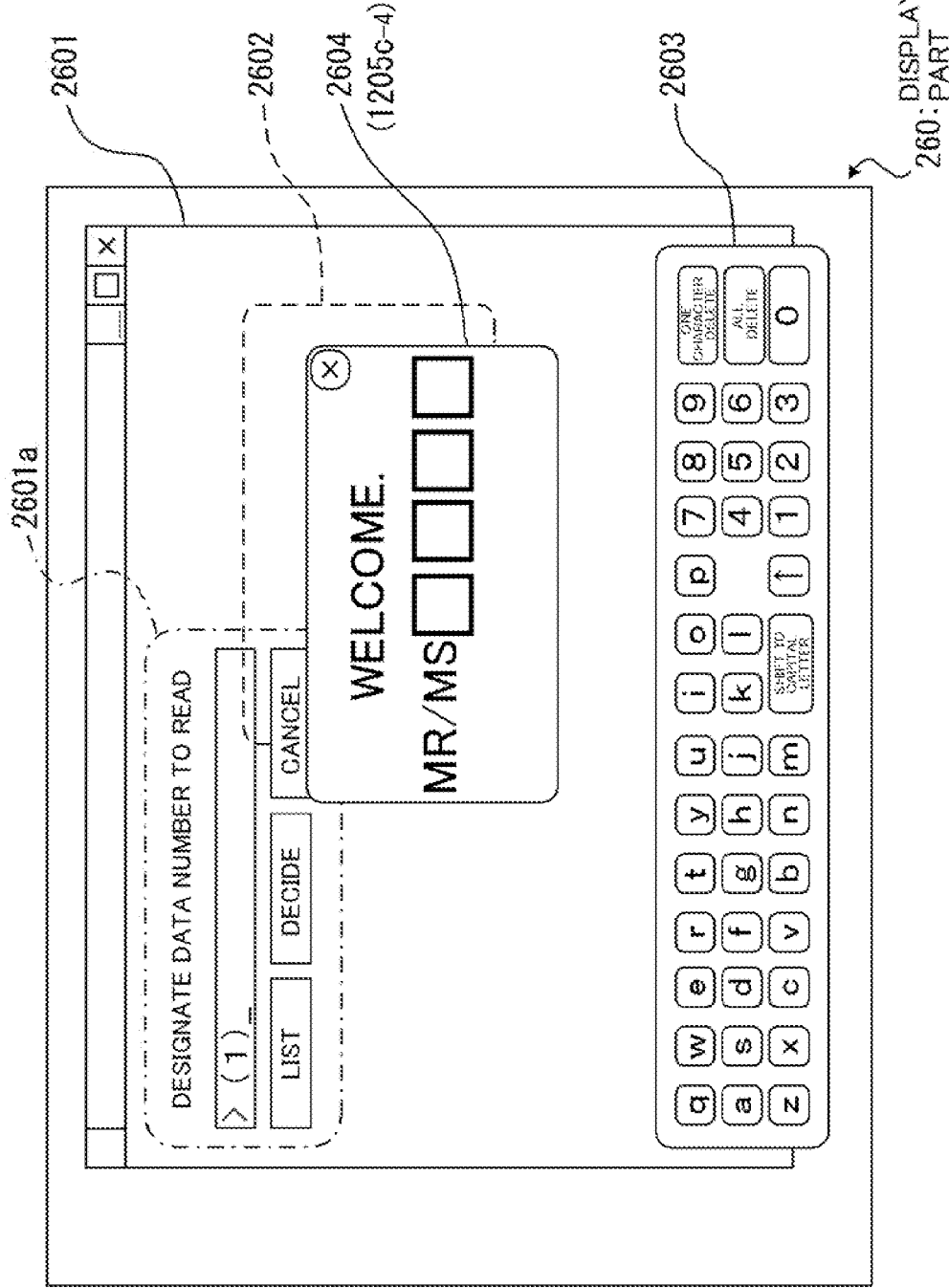
FIG. 11 illustrates a display example on the display part 260 of the MFP 11 in a modification of the exemplary embodiment of the present disclosure.

For example, causing the log-in message 1205*c*-4 to display thereon a private name having a user number (1) who is registered in the user region 1206 will result in a condition of message screen 2604 shown in FIG. 11.

In such a way, without having to display a success in authentication, it is easy for the user to recognize his/her success in authentication.

It is to be noted the information piece to be added to the character string is not limited to the private name in the user management region 1206 and may be the authenticated user ID. This manner is applicable even when authentication of the "unknown user".

Of course, the present disclosure is not limited to the above-described MFP and needless to say that even an on-line database and a server are within the coverage range of the present disclosure. In even such cases, it is possible to expect a prevention of information leakage due to an unauthorized access such as Brute-force attack, thereby preventing disadvantages from spreading to the regular users who may suffer from a loss.

What is claimed is:

1. An electronic apparatus comprising:
a memory part that is configured to store a recognizing code that is correlated with each of plural users and a key code correlated with the recognizing code; and
a control part that is configured to give a user an exclusive authority for executing a specific process when an inputted combination of a recognizing code and a key code is coincident with a stored combination of the recognizing code and the key code, wherein
the control part is configured, when a request is made for accepting the specific process and concurrently the inputted combination of the recognizing code and the key-code is not coincident with the stored combination of the recognizing code and the key code, to notify, without executing the specific process, a message to the effect that an instruction reception of the specific process is initiated, to the user who has entered the inputted combination of the recognizing code and the key code;
the control part is configured to perform a log-in upon receiving a recognizing code and a key code and assign to the log-in, a log-in type from a plurality of log-in types having different access rights;
the plurality of log-in types include a management user, a registered user, a temporary user, and an unknown user,
the control part assigns the log-in type as the management user when the received recognizing code and key code are coincident with each other and registered in the electronic apparatus as the management user;
the control part assigns the log-in type as the registered user when the received recognizing code and key code are coincident with each other and registered in the electronic apparatus as the registered user;
the control part assigns the log-in type as the temporary user when the received recognizing code corresponds to a recognizing code registered in the electronic apparatus and the received key code is not the key code corresponding to the recognizing code registered;
the control part assigns the log-in type as the unknown user when the received recognizing code is not registered in the electronic apparatus as a user;
when the control part assigns the log-in type as the management user, the control part permits the user to execute a printing process, execute a scanning process, access equipment settings, access security settings, and access user data;
when the control part assigns the log-in type as the registered user, the control part permits the user to execute the printing process and execute the scanning process, and restricts the user from accessing the equipment settings, accessing the security settings, and accessing the user data;
when the control part assigns the log-in type as the temporary user, the control part permits the user to execute a limited printing process in which spooling amount is set differently than the printing process and execute a limited scanning process in which a scanning amount is set differently than the scanning process and restricts the user from executing the printing process, executing the scanning process, accessing the equipment settings, accessing the security settings, and accessing the user data; and when the control part assigns the log-in type as the unknown user, the control part restricts the user from executing the limited printing process, executing the limited scanning process, executing the printing process, executing the scanning process, accessing the equipment settings, accessing the security settings, and accessing the user data.

2. The electronic apparatus according to claim 1, wherein the user whose inputted combination of the recognizing code and the key code is coincident with the stored combination of the recognizing code and the key code is defined as a first class user who has an authorization to execute the specific process, while the user whose inputted combination of the recognizing code and the key code is not coincident with the stored combination of the recognizing code and the key code is defined as a second class user who has not an authorization to execute the specific process.

3. The electronic apparatus according to claim 2, wherein the notification to the effect that the instruction reception of the specific process is initiated is executed by way of a message image that is formed by imaging a character string as a full text of the notification to the effect that the instruction reception of the specific process is initiated, and concurrently when the user is the second class user, the message image is in the form of an obfuscated message image.

4. The electronic apparatus according to claim 3, further comprising a memory portion that stores the character string as the full text of the notification to the effect that the instruction reception of the specific process is initiated, an imaging program that converts the character string into the message image, and an obfuscating program that converts the message image into the obfuscated message image, wherein the control part, when the user is the second class user, before notifying a message to the effect that an instruction reception of the specific process is initiated, converts the character string into the message image and then converts the resulting message image into the obfuscated message image.

5. The electronic apparatus according to claim 4, wherein the memory portion stores an individual identification information piece that is correlated with each of the recognizing codes in addition to the recognizing codes, and when the user is found to be the first class user, the control part inserts or adds the individual identification information piece in or to, respectively, the character string, and then converts the resulting character string into the message image.

6. The electronic apparatus according to claim 4, wherein the control part notifies the obfuscated message image to the user instead of notifying a message to the effect that inputted combination of the recognizing code and the key code is not coincident with the stored combination of the recognizing code and the key code.

7. The electronic apparatus according to claim 3, wherein when the user is found to be the first class user, the control part inserts or adds the recognizing code that is correlated with the resulting user in or to, respectively, the character string, and then converts the resulting character string into the message image.

8. An authentication method for use in conjunction with an electronic apparatus, the electronic apparatus including a memory part that is configured to store a recognizing code that is correlated with each of plural users and a key code correlated with the recognizing code and a control part, the authentication method comprising the steps of:

causing the control part to perform a log-in upon receiving a combination of an inputted recognizing code and an inputted key code;

causing the control part to determine whether or not the inputted combination of the recognizing code and the key code is coincident with a stored combination of the recognizing code and the key code;

causing, when the inputted combination of the recognizing code and the key code is coincident with the stored combination of the recognizing code and the key code, the control part to give a user an exclusive authority for executing a specific process; and causing, when a request is made for accepting the specific process and concurrently the inputted combination of the recognizing code and the key code is coincident with the stored combination of the recognizing code and the key code, the control part true to notify, without executing the specific process, a message to the effect that an instruction reception of the specific process is initiated, to the user who has entered the inputted combination of the recognizing code and the key code; and causing the control part to assign to the log-in, a log-in type from a plurality of log-in types having different access rights, wherein the plurality of log-in types include a management user, a registered user, a temporary user, and an unknown user, wherein:

the control part assigns the log-in type as the management user when the inputted recognizing code and the inputted key code are coincident with each other and registered in the electronic apparatus as the management user;

the control part assigns the log-in type as the registered user when the received recognizing code and key code are coincident with each other nd registered in the electronic apparatus as the registered user;

the control part assigns the log-in type as a temporary user when the received recognizing code corresponds to a recognizing code registered in the electronic apparatus and the received key code is not the key code corresponding to the recognizing code registered;

the control part assigns the log-in type as an unknown user when the received recognizing code is not registered in the electronic apparatus as a user;

when the control part assigns the log-in type as the management user, the control part permits the user to execute a printing process, execute a scanning process, access equipment settings, access security settings, and access user data;

when the control part assigns the log-in type as the registered user, the control part permits the user to execute the printing process and execute the scanning process, and restricts the user from accessing the equipment settings, accessing the security settings, and accessing the user data;

when the control part assigns the log-in type as the temporary user, the control part permits the user to execute a limited printing process in which spooling amount is set differently than the printing process and execute a limited scanning process in which a scanning amount is set differently than the scanning process and restricts the user from executing the printing process, executing the scanning process, accessing the equipment settings, accessing the security settings, and accessing the user data; and when the control part assigns the log-in type as the unknown user, the control part restricts the user from executing the limited printing process, executing the limited scanning process, executing the printing process, executing the scanning process, accessing the equipment settings, accessing the security settings, and accessing the user data.

\* \* \* \* \*